United States Patent

Thoraval et al.

[11] 4,140,333
[45] Feb. 20, 1979

[54] REAR-AXLE STRUCTURE FOR AUTOMOTIVE VEHICLES

[75] Inventors: Richard Thoraval, Velizy; Rene Krin, Colombes; Jean-Paul Delmas, Montfort l'Amaury, all of France

[73] Assignee: Regie Nationale des Usines Renault, Billancourt, France

[21] Appl. No.: 791,954

[22] Filed: Apr. 28, 1977

[30] Foreign Application Priority Data

Apr. 30, 1976 [FR] France ............................... 76 12894

[51] Int. Cl.² ........................................... B60G 11/18
[52] U.S. Cl. .................................... 280/700; 280/721
[58] Field of Search ............... 280/700, 721, 664, 788; 267/57

[56] References Cited

U.S. PATENT DOCUMENTS

| 2,702,701 | 2/1955 | Thorne | 280/721 |
| 3,207,497 | 9/1965 | Schoonover | 267/57 |
| 3,615,081 | 10/1971 | Ravenel | 267/57 |
| 3,778,082 | 12/1973 | Grosseau | 267/57 |

FOREIGN PATENT DOCUMENTS

| 720049 | 4/1942 | Fed. Rep. of Germany | 280/700 |
| 540406 | 8/1955 | France | 280/700 |

Primary Examiner—Joseph F. Peters, Jr.
Assistant Examiner—John A. Carroll
Attorney, Agent, or Firm—Oblon, Fisher, Spivak, McClelland & Maier

[57] ABSTRACT

An improved rear axle suspension system wherein independently suspended wheels are supported from an extremity of a trailing wheel arm by a wheel spindle thereof, the wheel arms having extensions aligned transversely of the vehicle and constituting semi-axles, the adjacent ends of which engage in rotatable fashion with one being disposed at least partially inside the other, while the other ends are rotatably supported by bracing elements fastened to longitudinal frame members of the vehicle, the shock absorbers being attached at their upper ends to extensions of these lateral bracing elements and at their lower ends to the shanks of the wheel spindles, such that the axes of rotation of the wheel arms and of the shock absorbers are as far apart as possible, the extensions of the lateral bracing elements to which the upper ends of the shock absorbers are attached being disposed so that the shock absorbers are slightly inclined to the horizontal, whereby a sensibly variable reduction ratio between the displacement of the shock absorber pistons and the vertical excursions of the wheels is provided.

4 Claims, 5 Drawing Figures

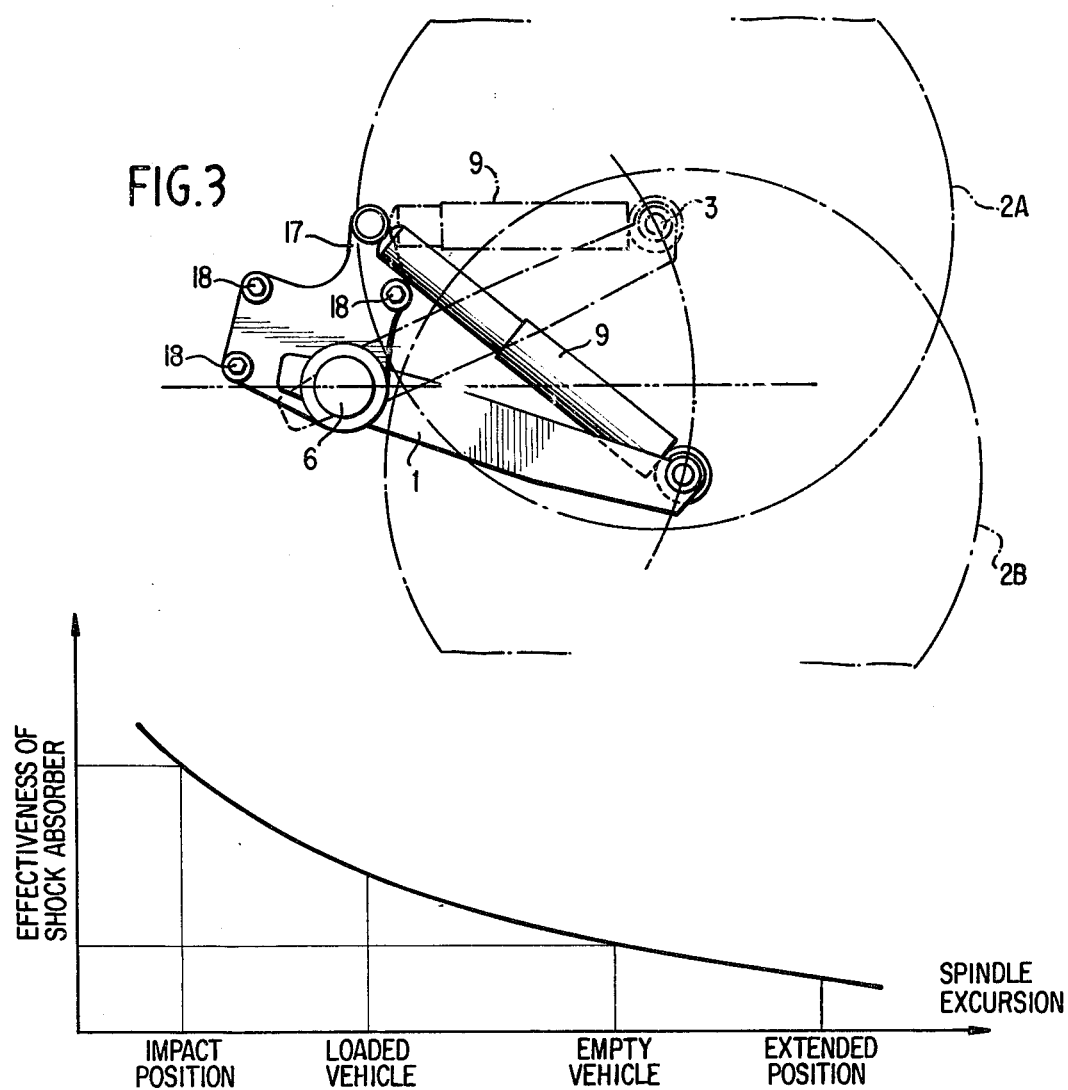
FIG.3
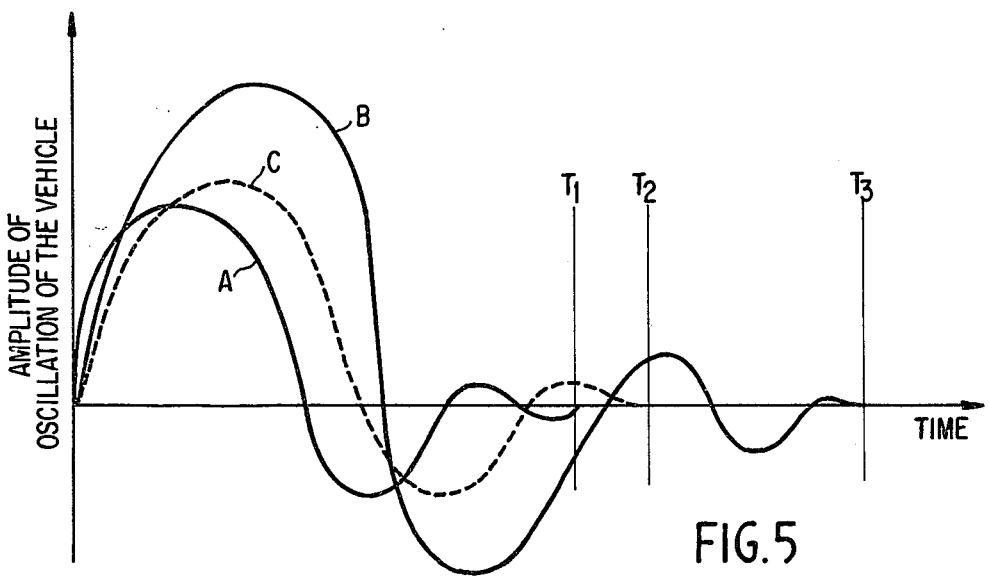
FIG.4
FIG.5

REAR-AXLE STRUCTURE FOR AUTOMOTIVE VEHICLES

BACKGROUND OF THE INVENTION

1. Field of the Invention

The present invention relates generally to the structure of a rear axle with independent-suspension wheels for automotive vehicles.

2. Description of the Prior Art

A number of rear-axle structures with independently sprung wheels are already known, which are generally satisfactory in terms of the roadholding qualities of the vehicles equipped therewith.

It has been found, however, that the characteristics of these suspensions are not constant with regard to damping wheel shocks. On the contrary, a suspension which is effective enough when the vehicle is lightly loaded may prove to be only mediocre when the latter a traveling fully loaded. This is readily apparent from the low damping of the body oscillations following wheel shocks, the body returning to its equilibrium position in a disagreeable manner over too long a period of time.

SUMMARY OF THE INVENTION

Accordingly, it is a primary object of the present invention to improve this situation and to provide a suspension system of the type characterized herein in which improved damping of wheel shocks is afforded, even when the vehicle is heavily loaded.

A further object is to provide an improved rear axle suspension structure having simplified construction and being easy to mount on a vehicle.

The foregoing and other objects are attained, according to at least one aspect of the present invention, by mounting the shock absorbers to provide a variable reduction ratio with respect to the wheel excursions, that is, with respect to the loading of the vehicle. This effect is achieved by fixing the axes of rotation of the wheel arms and of the shock absorbers as far apart as possible by attaching the lower end of the shock absorber to the shank of the wheel spindle, while its other end is located so that the shock absorber is nearly horizontal.

BRIEF DESCRIPTION OF THE DRAWINGS

Various other objects, features and attendant advantages of the present invention will be more fully appreciated as the same becomes better understood from the following detailed description when considered in connection with the accompanying drawings, in which:

FIG. 3 is a schematic view, from the side, of half of the suspension of this invention, indicating the two extreme positions of the wheel during impact and rebound;

FIG. 4 is a curve showing the damping of the shock absorber as a function of the excursion of the spindle; and FIG. 5 is a curve of the amplitude of oscillation of a vehicle furnished with the axle of the present invention, compared with similar curves for vehicles with standard suspensions, subjected to the same shocks.

DETAILED DESCRIPTION OF THE PREFERRED EMBODIMENT

Figure 1:
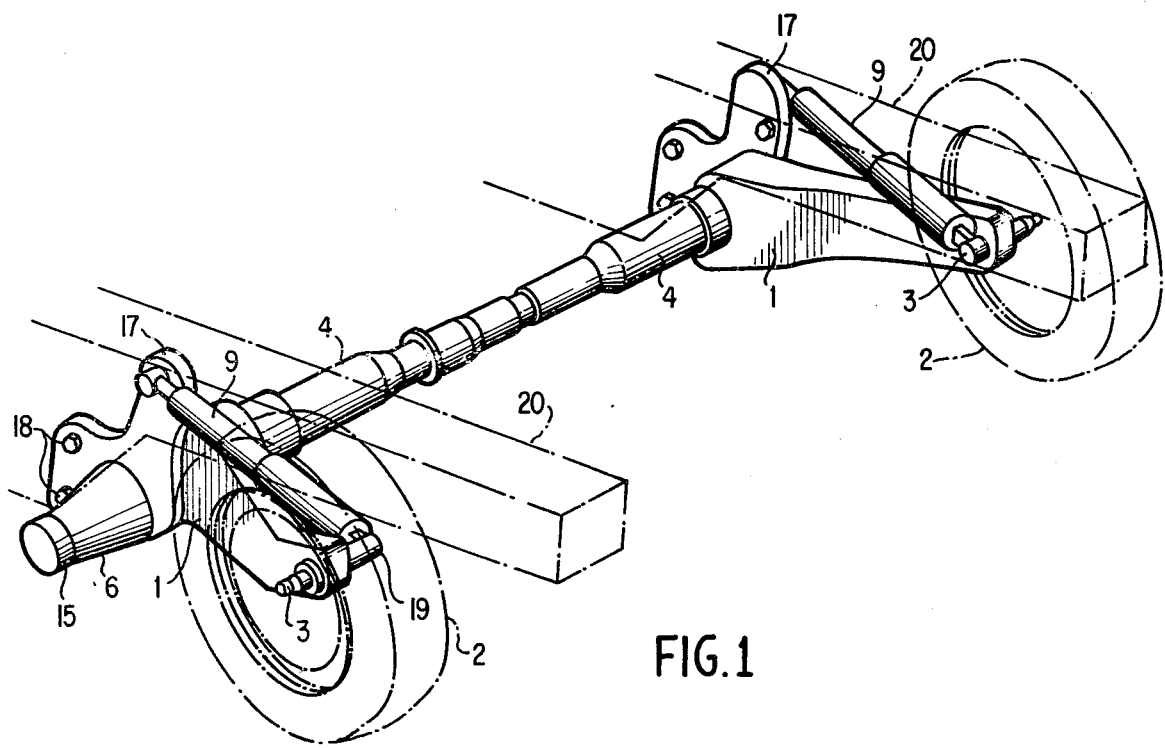
FIG. 1 is a perspective view of a rear axle constructed according to the present invention.
Figure 2:
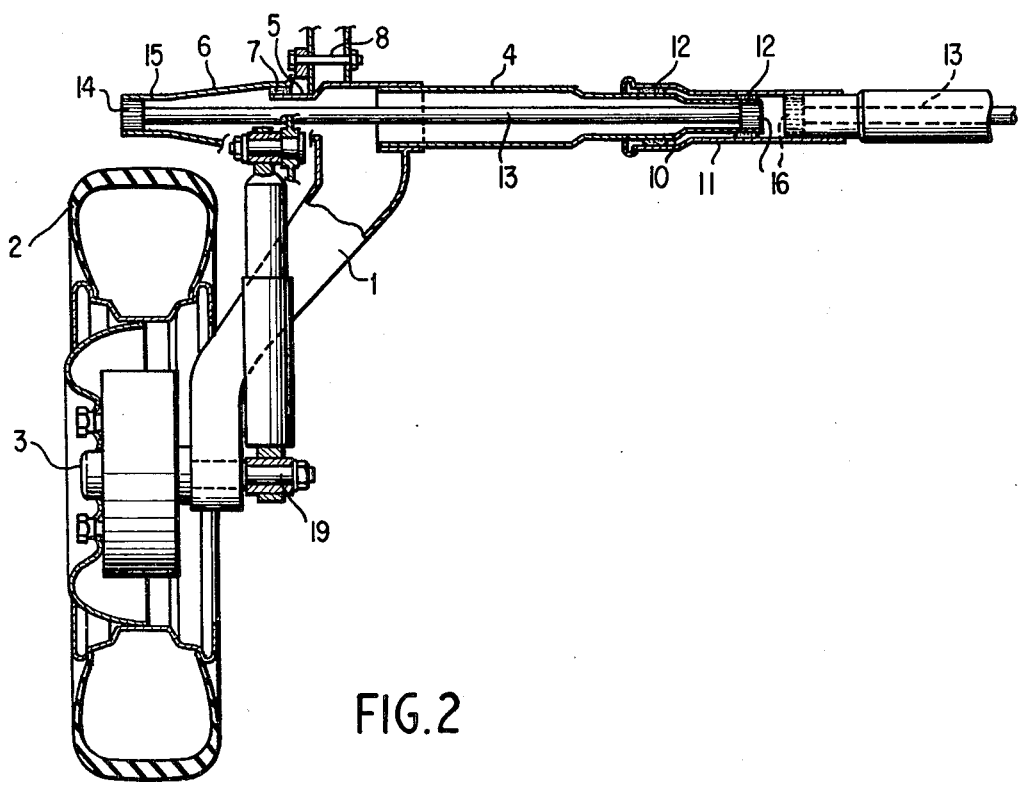
FIG. 2 is a view, from above, of half the axle shown in FIG. 1.

Referring now to the drawings, and more particularly to FIGS. 1 and 2 thereof, the rear axle illustrated there is of the independent wheel-suspension type, having trailing arms.

The wheel arms 1, arranged essentially along the length of the vehicle, support at one of their extremities the wheels 2 of the vehicle, which are mounted in standard fashion by means of spindles 3. At the other end of each of the wheel arms is attached an extension 4 arranged transversely of the vehicle and constituting a semi-axle.

An outside portion 5 of the extension 4 fits into a lateral-bracing housing 6 which serves as a support bearing therefor through the intermediary of a bearing 7 or an elastic joint permitting relative rotation between these two elements. The housing 6 is fastened to the vehicle by a plurality of bolts 18, shown being three in number, anchored to a reinforced portion of the body or to longitudinal members 20 of the chassis through plates affixed to the housing.

The inner portions 10 and 11 of the respective semi-axles engage one another, one being received within the other, and are movable in rotation because of self-lubricating bands 12 provided therebetween.

The spring function of the present invention is provided, for example, by torsion bars 13, the outer ends of which are anchored in the outer ends 15 of the housings 6, while their inner ends 16 are fixed in the interior of each semi-axle in the portion thereof nearest the longitudinal axis of the vehicle.

One of the essential characteristics of the present invention is the positioning of shock absorbers 9 of the suspension. These are attached, on the one hand, to the upper zones 17 of the plates for fastening the housings 6 to the frame and, on the other hand, to the shanks 19 of the spindles 3, by the intermediary of bearings or elastic joints permitting rotation of the ends of the shock absorbers with respect to their points of attachment.

The functioning of the present invention is illustrated in FIG. 3.

The wheel 2 is shown in its two extreme positions, that of 2A, in which, upon impact, the wheel is against the stop, and that of 2B, wherein maximum extension occurs when passing over a hole.

As will be explained below, this particular arrangement of the shock absorber leads to a variable reduction ratio between the vertical displacements of the wheels and the resulting shock-absorber piston displacements due to the fact that the axis of rotation of each of the wheel arms 1 and that of the respective shock absorber 9 are not coincident. The following example is given by way of a non-restrictive one:

Consider a 20 mm vertical displacement of the wheel, near its full-extension position 2B, occuring in one second. The shock-absorber piston will move inside the cylinder over a distance of 5 mm. Then, with the wheel near its impact position 2A, for the same 20mm vertical displacement in one second, the corresponding shortening of the shock absorber with be 10mm.

Thus, the effectiveness of the shock absorber increases considerably when the wheel 2 moves vertically near its impact position 2A, which happens particularly when the vehicle is more heavily loaded.

This leads to an improvement in the comfort of the suspension, as well as in the damping characteristics thereof.

The curve in FIG. 4 illustrates the effectiveness of the shock absorber as a function of the working conditions for a given vertical displacement of the wheel or spindle. The ordinates give the instantaneous reduction ratio of the shock absorber, which is a quantity proportional to its effectiveness, while the abscissas give the vertical displacement of the wheel in its characteristic positions and for different loadings of the vehicle. The curve well illustrates what was said above, namely that the effectiveness of the shock absorber is greater when the vehicle is loaded and when the displacement takes place near the impact position of the wheel.

FIG. 5 provides curves illustrating the transient oscillations of empty and loaded vehicles, with and without the variable-reduction-ratio shock absorber of the invention installed. It is recalled that the transient decay time of a suspension is the time necessary for the latter to return to its stable equilibrium position after disturbance by a shock. In the graph, the amplitude of oscillation of the frame is displayed in the ordinate direction and time is given along the axis of abscissas. Curve A is characteristic of an empty vehicle with a standard suspension, while the same vehicle, when loaded, gives the curve B. The curve C results from the use of the variable-reduction-ratio shock absorber on a loaded vehicle.

It is thus seen that the time T2 necessary for return to equilibrium of the loaded vehicle, with a standard suspension, is considerably greater than the corresponding time T1 for the same vehicle, when empty. In contrast, the time T3 which is necessary for the return to equilibrium of the loaded vehicle, equipped with variable-reduction-ratio shock absorbers, is not notably greater than T1 and is much less than T2.

Another advantage of the structure of the present suspension results from its simplicity and its ease of mounting. In fact, the only points of attachment of the assembly to the chassis are the three bolts 18 which join the lateral-bracing housings 6 to the naturally reinforced portions of the vehicle, constituted by longitudinal frame members 20. It is, consequently, not necessary to provided additional reinforced zones of the chassis which would lead to a weight gain, and thus a savings of material is achieved.

Furthermore, the distance between the places of attachment of the rear axle on the right and left sides of the vehicle, being maximal since it corresponds to practically the entire width of the vehicle, results in the mounting of the axle with very precise initial clamping angles and avoids any subsequent adjustments of the assembly.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. In a rear axle of an automotive vehicle, with independently suspended wheels, each supported from an extremity of a trailing wheel arm by a wheel spindle thereof, the improvement comprising:

said wheel arms having extensions aligned transversely of the vehicle and constituting semi-axles, the adjacent ends of which engage, in rotatable fashion, with one being disposed at least partially inside the other, while the other ends are rotatably supported by lateral-bracing elements fastened to longitudinal frame members of the vehicle;

said lateral bracing elements also having extensions to which the upper ends of respective shock absorbers are attached;

the lower ends of said shock absorbers being attached to the shanks of said wheel spindles; and said extensions of said lateral bracing elements to which the upper ends of the said shock absorbers are attached being disposed so that said shock absorbers are slightly inclined from the horizontal, thereby providing a sensibly variable reduction ratio between the displacement of the shock-absorber pistons and the vertical excursions of the wheels.

2. In a rear axle of an automotive vehicle, as set forth in claim 1, said rear axle being attached to the automative frame only through plates of said lateral-bracing elements secured to said vehicle longitudinal frame members.

3. In a rear axle of an automotive vehicle, as set forth in claim 2, said plates of said lateral bracing elements being fastened by bolts to said longitudinal frame members.

4. In a rear axle of an automotive vehicle, as set forth in claim 3, wherein said longitudinal frame members constitute reinforced vehicle body portions.

* * * * *